Patented July 22, 1924.

1,502,379

UNITED STATES PATENT OFFICE.

HENRY DREYFUS, OF LONDON, ENGLAND.

MANUFACTURE OF CELLULOSE DERIVATIVES.

No Drawing. Application filed April 25, 1921. Serial No. 464,387.

*To all whom it may concern:*

Be it known that I, HENRY DREYFUS, a citizen of the Swiss Republic, of London, England, have invented certain new and useful Improvements in or Relating to the Manufacture of Cellulose Derivatives, of which the following is a specification.

This invention relates to the manufacture of new cellulose derivatives, representing reaction compounds of cellulose or its conversion products with halogen substitution products of glycols or other polyhydric alcohols in general, whether containing one or more substitution halogens; for example:

ethylene chloride $CH_2Cl CH_2Cl$
propylene chloride $CH_3 \cdot CHCl \cdot CH_2Cl$
ethylene chlorhydrin $CH_2Cl \cdot CH_2 \cdot OH$
propylene chlorhydrin $CH_3 \cdot CHCl \cdot CH_2 \cdot OH$

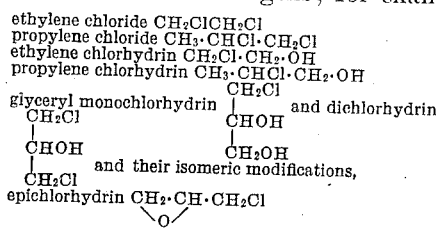

epichlorhydrin $CH_2 \cdot CH \cdot CH_2Cl$ \O/ and so forth, one or more hydroxyl hydrogens of the cellulose body combining with one or more halogen atoms of the said halogen substitution products, the residues of which replace these hydroxyl hydrogens, thereby forming corresponding cellulose ethers or derivatives.

In particular according to the invention I employ such halogen substitution products of polyhydric alcohols, as contain one or more free hydroxyls, with a view to the retention of such hydroxyl groups in the resulting cellulose derivative. In cases where the replacing group or groups combined with the cellulose still contain chlorine, such chlorine may afterwards, if desired, be removed wholly or partly and replaced by a hydroxyl group or groups.

The new cellulose derivatives may be employed for the various applications for which cellulose ethers or esters are capable or suitable.

In carrying out the invention, cellulose is more particularly employed or conversion products thereof not soluble in dilute alkali at ordinary temperature, but other conversion products such as alkali cellulose, cellulose hydrates, oxy-cellulose, viscose and so forth may be used. The cellulose or conversion product employed should preferably be as little depolymerized as possible. In practicing the invention I treat the cellulose or conversion product with suitable basic substances, preferably caustic alkalies, and the halogen substitution products of glycols or other polyhydric alcohols.

Other methods may be employed, but preferably the execution is on the lines herein described.

The execution of the process with basic substances such as caustic alkali, may take place in such a manner that the cellulose is impregnated with alkali, preferably in a concentrated form, and afterwards treated with ethylene chlorhydrin or other halogen substitution product of the character referred to.

For the execution of the reaction reduced quantities of water are preferably employed, or even no water. The total amount of water present or added in the etherification, disregarding water formed in the etherifying reaction itself, may be from about the natural humidity content of the cellulose or conversion product up to about four times the weight of the dry cellulose or conversion product, and is preferably between 50% and 100%–150% of the weight of the cellulose or conversion product, and the total alkali employed in the etherification, whether added at the commencement of or during the etherification is preferably such an amount as would represent an aqueous solution of 50 to 75 or 95 per cent by weight if it were supposed as dissolved in the said quantity of water present or added in the above sense.

The reaction may, however, be executed with more water and other total quantities of alkali, but not so advantageously.

The temperature of reaction and conditions of working may vary very considerably according to the particular halogen substitution products employed and other circumstances. Usually the reaction will be conducted at temperatures below or not much exceeding ordinary temperature and preferably with cooling to about 0° C. or lower, but the invention is not restricted in this respect.

*Example I.*

Cellulose is impregnated with 50% caustic soda solution so that about 4 molecular equivalents of caustic soda are contained in it relatively to one molecule of cellulose $C_6H_{10}O_5$. The cellulose is then kneaded for about half an hour with 2 to 3 molecular equivalents of ethylene chlorhydrin preferably while cooling at about 0° C., and the reaction product is afterwards treated with 6 further molecular equivalents of caustic soda in the form of powder, and the mass is then kneaded for about half an hour with a further 3 to 5 molecular equivalents of ethylene chlorhydrin preferably cooling at about 0° C. until towards the end, when the temperature may be allowed to rise to or above ordinary temperature. If desired a further addition of 6 molecules of alkali and 3 to 4 molecules of ethylene chlorhydrin may be similarly made.

*Example II.*

Instead of working in the above way, the cellulose is impregnated with water, for example 50% to 400%, but preferably not more than 100-150% of water, relatively to one molecule of cellulose $C_6H_{10}O_5$, and the alkali is added in powdered form, the procedure being otherwise similar to that just described.

*Example III.*

Cellulose is impregnated with a 50% caustic soda solution so as to contain about 4 molecules of caustic soda per molecule of cellulose $C_6H_{10}O_5$. The cellulose is then kneaded for about one hour with 2 to 3 molecules of glyceryl monochlorhydrin preferably while cooling to about 0° C. The resulting mass is kneaded with 6 further molecular equivalents of caustic soda powder and then 3 to 5 molecules of glyceryl monochlorhydrin are kneaded in during about an hour preferably cooling at about 0° C. until towards the end when the temperature may be allowed to rise to or above ordinary temperature. If desired a further addition of 6 molecules of alkali and 3 to 4 molecules of glyceryl chlorhydrin may be similarly made.

The particular methods described are only given by way of illustration and may be varied within wide limits without departing from the spirit of the invention.

Much less of the chlorhydrin than above indicated may be employed.

The ethylene chlorhydrin or glyceryl monochlorhydrin may be replaced by other halogen substitution products of the character referred to or mixtures of any of these bodies may be employed.

The whole of the alkali may be added prior to the treatment with the halogen substituted product of the polyhydric alcohol. In the same way the whole of the halogen derivative may be incorporated or added at once or in portions at a time, or uninterruptedly during the process.

The reaction may be executed in higher or lower boiling diluents or solvents, such for example as benzol.

For the purpose of facilitating the reaction, traces of copper powder, copper salts or hydroxides, or any other suitable catalyst which facilitates the exchange of the halogen may be employed.

Instead of caustic soda, caustic potash or any other suitable basic substance of inorganic or organic nature may be used.

According to the quantity of ethylene chlorhydrin or other halogen substitution product used for introducing groups such as hereinbefore referred to, one, two or more of such groups may be introduced into the cellulose body.

"Mixed" cellulose derivatives may be produced in which different residues or groups of the character referred to are introduced into the cellulose body either simultaneously or successively. Also "mixed" cellulose derivatives may be produced containing one or more residues or groups of the character hereinbefore indicated, together with one or more ethyl, methyl or other alkyl groups as referred to in my specification S. No. 401381 (British specification No. 21474 of 1919), or one or more benzyl or homologous groups or their substitution groups, or groups derived from xylenes, or their substitution products or homologues, as referred to in my specification S. No. 401383 (British specification No. 21661 of 1919), or groups pertaining to more than one of these classes.

Generally it is to be understood that the invention includes the introduction into the cellulose body of one or more groups derived from halogen substitution products of polyhydric alcohols or aliphatic ethers as mentioned, independently of the fact whether other groups are introduced into the cellulose body or not.

The term cellulosic bodies in the claiming clauses is to be understood as including not only cellulose but also conversion products thereof.

What I claim and desire to secure by Letters Patent is:—

1. Process for the manufacture of cellulosic derivatives characterized by the introduction into the cellulosic molecule of at least one group derived from halogen substitution products of polyhydric alcohols.

2. Process for the manufacture of cellulosic derivatives according to claim 1 characterized by the employment of halogen substitution products of polyhydric alcohols, containing at least one free hydroxyl group whereby such hydroxyl is retained in the resulting cellulosic derivative.

3. Process for the manufacture of cellulosic derivatives according to claim 1, characterized in that cellulosic bodies are treated in presence of a base with halogen substitution products of polyhydric alcohols, for the purpose of forming corresponding cellulose ethers by combination of hydroxyl hydrogen of the cellulosic body with halogen of the halogen substitution product.

4. Process for the manufacture of cellulosic derivatives according to claim 1, characterized in that cellulosic bodies are treated in presence of alkali with halogen substitution products of polyhydric alcohols, for the purpose of forming corresponding cellulose ethers by combination of hydroxyl hydrogen of the cellulosic body with halogen of the halogen substitution product, the total amount of water employed in the etherification, disregarding water formed in the reaction itself, being not greater than from about the natural humidity content of the cellulosic body up to about four times the weight of the dry cellulosic body, and the total amount of alkali employed in the etherification being a total quantity which would represent an aqueous solution of between 50 and about 95 per cent if it were dissolved in said total quantity of water.

5. Process for the manufacture of cellulose derivatives according to claim 1, characterized in that cellulosic bodies are treated in presence of alkali with halogen substitution products of polyhydric alcohols, for the purpose of forming corresponding cellulose ethers by combination of hydroxyl hydrogen of the cellulosic body with halogen of the halogen substitution product, the total amount of water employed in the etherification, disregarding water formed in the reaction itself, being not greater than from about the natural humidity content of the cellulosic body up to about one and a half times the weight of the dry cellulosic body, and the total amount of alkali employed in the etherification being a total quantity which would represent an aqueous solution of between 50 and about 95 per cent if it were dissolved in said total quantity of water.

6. Process for the manufacture of cellulose derivatives according to claim 1, characterized in that cellulosic bodies not soluble in dilute alkali at ordinary temperature, are treated in presence of alkali with halogen substitution products of polyhydric alcohols, for the purpose of forming corresponding cellulose ethers by combination of hydroxyl hydrogen of the cellulosic body with halogen of the halogen substitution product, the total amount of water employed in the etherification, disregarding water formed in the reaction itself being not greater than from about the natural humidity content of the cellulosic body up to about one and a half times the weight of the dry cellulosic body, and the total amount of alkali employed in the etherification being a total quantity which would represent an aqueous solution of between 50 and about 95 per cent if it were dissolved in said total quantity of water.

7. Process for the manufacture of cellulosic derivatives according to claim 1, characterized in that cellulosic bodies are treated in presence of a base with halogen substitution products of polyhydric alcohols, for the purpose of forming corresponding cellulose ethers by combination of hydroxyl hydrogen of the cellulosic body with halogen of the halogen substitution product, the etherifying reaction being performed in presence of an organic diluent not liable to undergo etherification.

8. Process for the manufacture of cellulosic derivatives according to claim 1, characterized in that cellulosic bodies are treated in presence of alkali with halogen substitution products of polyhydric alcohols, for the purpose of forming corresponding cellulose ethers by combination of hydroxyl hydrogen of the cellulosic body with halogen of the halogen substitution product, the total amount of water employed in the etherification, disregarding water formed in the reaction itself, being not greater than from about the natural humidity content of the cellulosic body up to about four times the weight of the dry cellulosic body, and the total amount of alkali employed in the etherification being a total quantity which would represent an aqueous solution of between 50 and about 95 per cent if it were dissolved in said total quantity of water, the etherifying reaction being performed in presence of an organic diluent not liable to undergo etherification.

9. Process for the manufacture of cellulosic derivatives according to claim 1, characterized in that cellulosic bodies are treated in presence of a base with halogen substitution products of polyhydric alcohols, for the purpose of forming corresponding cellulose ethers by combination of hydroxyl hydrogen of the cellulosic body with halogen of the halogen substitution product, the etherifying reaction being conducted in presence of a catalyst capable of facilitating the exchange of the halogen.

10. As new products, cellulose ethers containing combined with the cellulosic molecule ether-forming groups derived from polyhydric alcohols.

11. As new products, cellulose ethers containing combined with the cellulosic molecule an ether-forming group derived from a polyhydric alcohol.

In testimony whereof I have hereunto subscribed my name.

HENRY DREYFUS.